(12) United States Patent
Liao et al.

(10) Patent No.: US 8,626,972 B2
(45) Date of Patent: Jan. 7, 2014

(54) I2C MULTI-SLOT CIRCUIT SYSTEM AND METHOD FOR TRANSMITTING I2C SIGNALS

(75) Inventors: Wen-Yung Liao, Tu-Cheng (TW); Ruey-Shyang You, New Taipei (TW); Han-Che Wang, New Taipei (TW); Zhuo Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 260 days.

(21) Appl. No.: 13/097,094

(22) Filed: Apr. 29, 2011

(65) Prior Publication Data

US 2012/0191890 A1    Jul. 26, 2012

(30) Foreign Application Priority Data

Jan. 25, 2011  (CN) .......................... 2011 1 0026878

(51) Int. Cl.
*G06F 13/38*   (2006.01)
*G06F 3/00*    (2006.01)

(52) U.S. Cl.
USPC ............................................. 710/110; 710/8

(58) Field of Classification Search
USPC ...................... 710/8–10, 300, 104–107, 110, 710/305–306, 313–315
See application file for complete search history.

(56) References Cited

U.S. PATENT DOCUMENTS

| 7,240,130 | B2* | 7/2007 | Larson et al. ................... 710/29 |
| 7,814,249 | B2* | 10/2010 | Seo ............................... 710/110 |
| 7,849,244 | B2* | 12/2010 | Huang et al. ................... 710/110 |
| 8,205,017 | B2* | 6/2012 | Parr et al. ........................ 710/9 |
| 8,225,021 | B2* | 7/2012 | Adkins et al. ................ 710/110 |
| 8,364,872 | B2* | 1/2013 | Kim .............................. 710/110 |
| 2008/0270654 | A1* | 10/2008 | Reberga ........................ 710/110 |

\* cited by examiner

*Primary Examiner* — Tim T Vo
*Assistant Examiner* — Trisha Vu
(74) *Attorney, Agent, or Firm* — Altis Law Group, Inc.

(57) ABSTRACT

An I2C multi-slot circuit system includes a plurality of I2C slots for receiving a plurality of slave processors, a CPU, a logic control unit, and a I2C switch unit. The CPU determines an address of one of the I2C slots which to-be-transmitted data will be transmitted to, and generates a first logic control signal according to the determined address. The logic control unit enables the one of the I2C slots which the to-be-transmitted data will be transmitted to according to the first logic control signal. The I2C switch unit receives and transmits I2C signal converted from the to-be-transmitted data by the CPU to the I2C slot. A related method is also provided.

7 Claims, 3 Drawing Sheets

I2C MULTI-SLOT CIRCUIT SYSTEM AND METHOD FOR TRANSMITTING I2C SIGNALS

BACKGROUND

1. Technical Field

The present disclosure relates to multi-slot circuit systems, and particularly, to an I2C (Inter Integrated Circuit) multi-slot circuit system and a method for transmitting I2C signals.

2. Description of the Related Art

A master processor such as a CPU of an electronic device commonly communicates with one or more slaves processors through I2C buses. Each slave is allocated an address. The master accesses the slaves employing the addressing mode, that is, the master communicates with the slaves based on the corresponding addresses of the slaves. However, employing the addressing mode, the master needs to transmit many addressing signals, which may decrease efficiency of the master.

Therefore, there is room for improvement within the art.

BRIEF DESCRIPTION OF THE DRAWINGS

The components in the drawings are not necessarily drawn to scale, the emphasis instead being placed upon clearly illustrating the principles of an I2C multi-slot circuit system and a method for transmitting I2C signals. Moreover, in the drawings, like reference numerals designate corresponding parts throughout the several views.

DETAILED DESCRIPTION

Figure 1:
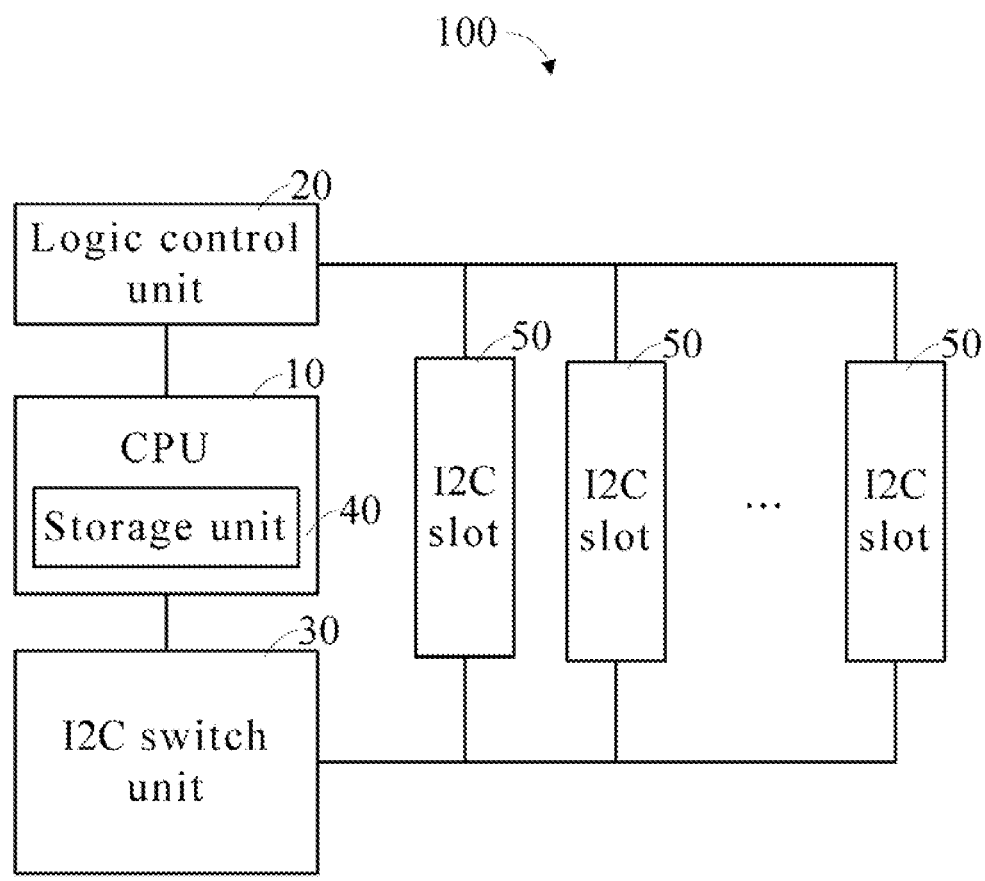
FIG. 1 is a block diagram of an I2C multi-slot circuit system in accordance with an exemplary embodiment.

Referring to FIG. 1, an I2C multi-slot circuit system 100 includes a CPU 10, a control logic unit 20, an I2C switch unit 30, and a plurality of I2C slots 50 each for receiving a slave processor (not shown). The CPU 10 is configured for converting to-be-transmitted data into I2C signals. When the CPU 10 needs to transmit the to-be-transmitted data to a target slave, the CPU 10 generates a first logic control signal according to an address of the slot 50 of the target slave. The logic control unit 20 enables the I2C slot 50 of the target slave according to the first logic control signal, accordingly; only the target slave connected to the enabled I2C slot 50 is capable of receiving the I2C signals from the CPU 10. Therefore, in this embodiment the CPU 10 does not need to employ several addressing modes to communicate with the slaves.

The CPU 10 includes a storage unit 40 storing the addresses of the I2C slots 50. The CPU 10 determines the address of the I2C slot 50 which the to-be-transmitted data will be transmitted to, and generates the first logic control signal according to the determined address. The logic control unit 20 enables the I2C slot 50 which the to-be-transmitted data will be transmitted to according to the first logic control signal. The CPU 10 turns on the I2C switch unit 30 to transmit the I2C signals to the enabled I2C slot 50, so that the slave connected to the enabled I2C slot 50 can receive the I2C signals from the enabled I2C slot 50.

Figure 2:
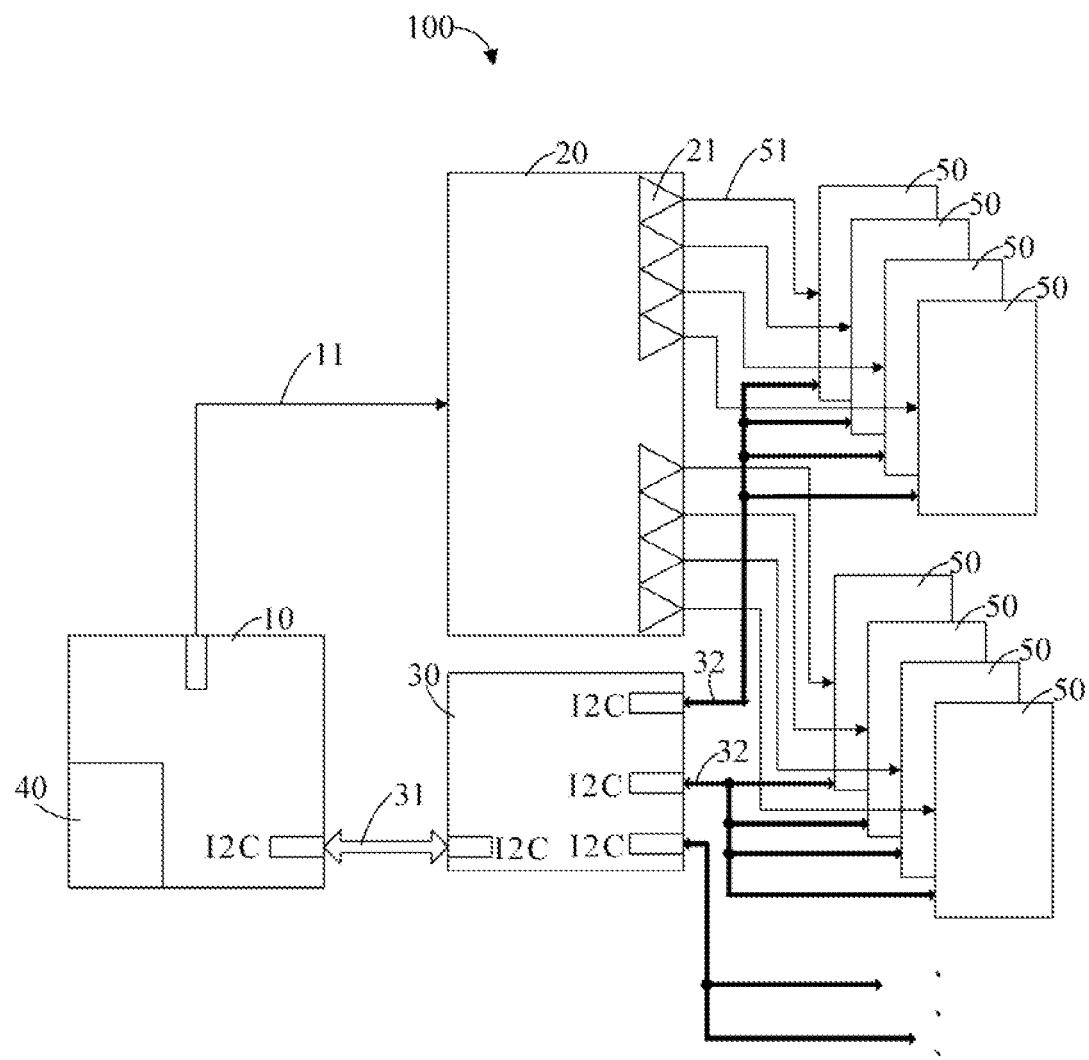
FIG. 2 is a circuit diagram of the I2C multi-slot circuit system of FIG. 1 in accordance with an exemplary embodiment.

Referring to FIG. 2, the CPU 10 is connected to the logic control unit 20 via a logic data line 11 for transmitting the logic control signal to the logic control unit 20. The CPU 10 is connected to the I2C switch unit 30 via a first I2C bus.

The logic control unit 20 generates enabling signals according to the first logic control signal. The logic control unit 20 includes a plurality of ports 21 for transmitting the enabling signals, and each of the ports 21 is connected to one I2C slot 50 via a signal line 51. In an exemplary embodiment, the logic control unit 20 is a control logic IC including eight ports 21, and the enabling signals are 01111111, 10111111, … 11111110. In an alternative embodiment, the logic control unit 20 is a control logic IC including 12 ports or 21 ports.

The I2C switch unit 30 includes multi-way I2C output ports (not labeled) and second I2C buses 32. The I2C switch unit 30 is connected to the I2C slots 50 via the second I2C buses 32 for transmitting I2C signals to the I2C slots 50. Each of the second I2C buses 32 is connected to at least one I2C slot 50. In this embodiment, the I2C switch unit 30 is an I2C switch IC including three second I2C buses, and each of the second I2C buses is connected to at least four I2C slots 50. When the logic control unit 20 enables the target I2C slot 50, the CPU transmits the I2C signals converted from the to-be-transmitted data to the I2C switch unit 30, and the I2C signals are transmitted to the enabled I2C slot 50 via the second I2C buses.

The CPU 10 is further configured for generating a second logic control signal when determining that transmission of the I2C signals is finished. The logic control unit 20 is further configured to generate a disabling signal to disable the enabled I2C slot 50 according to the second logic control signal. In this embodiment, the second logic control signal is 11111111 or 00000000.

Figure 3:
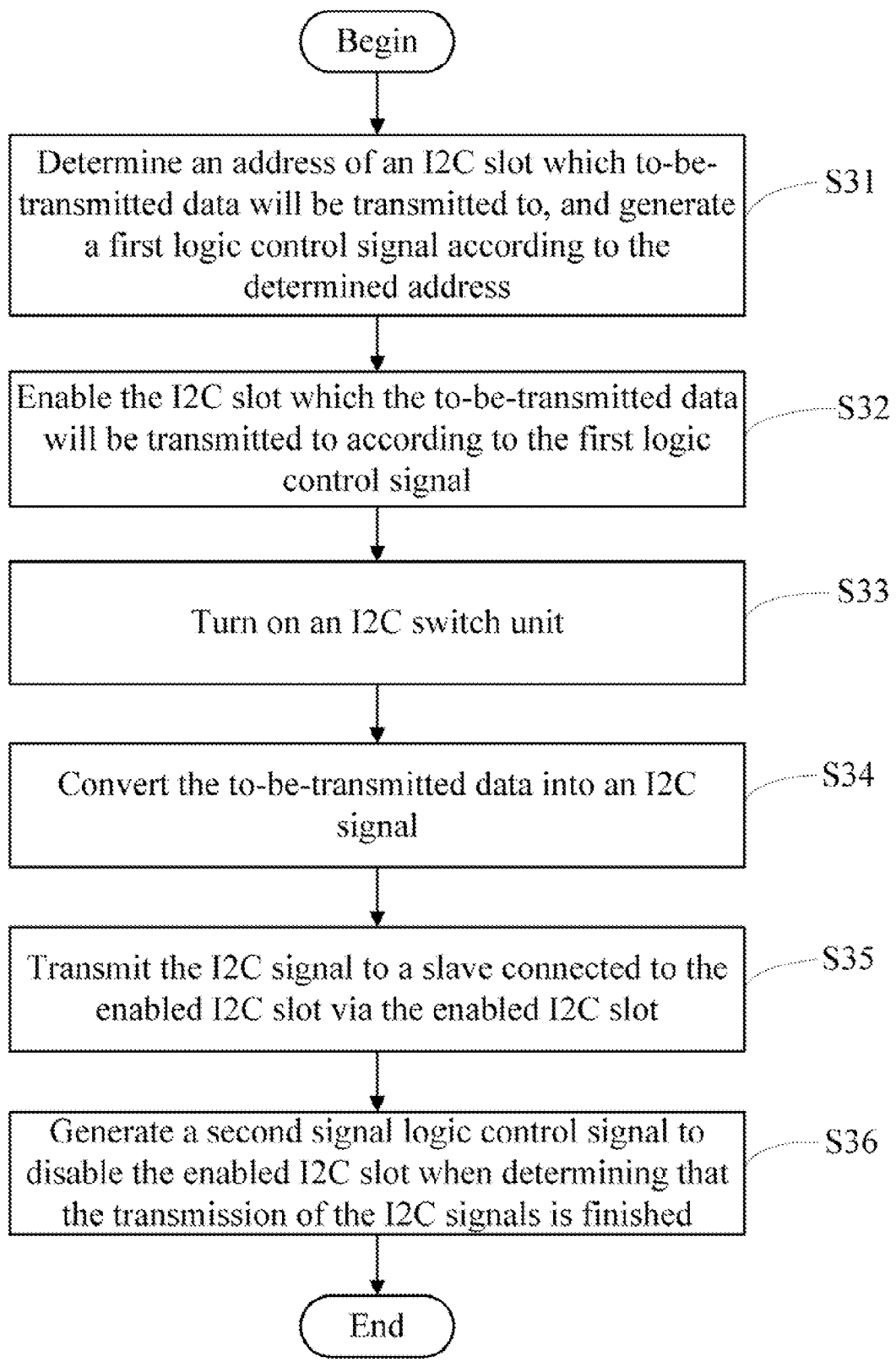
FIG. 3 is a flowchart of a method for transmitting I2C signals in accordance with an exemplary embodiment.

FIG. 3 is a flowchart of a method for transmitting the I2C signals in accordance with an exemplary embodiment.

In step S31, the CPU 10 determines the address of the I2C slot 50 which the to-be-transmitted data will be transmitted to, and generates the first logic control signal according to the determined address.

In step S32, the logic control unit 20 enables the I2C slot 50 which the to-be-transmitted data will be transmitted to according to the first logic control signal.

In step S33, the CPU 10 turns on the I2C switch unit 30.

In step S34, the CPU 10 converts the to-be transmitted data into the I2C signals.

In step S35, the I2C signals are transmitted to the slave connected to the enabled I2C slot.

In step S36, the CPU 10 generates the second logic control signal to disable the enabled I2C slot 50 when determining that transmission of the I2C signals is finished.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An I2C (Inter Integrated Circuit) multi-slot circuit system comprising:

a plurality of I2C slots for receiving a plurality of slaves;

a CPU configured for determining an address of one of the I2C slots to which to-be-transmitted data will be transmitted, and generating a first logic control signal according to the determined address, and being further configured for converting the to-be-transmitted data into an I2C signal;

a logic control unit connected to the CPU via a logic data line and each of the I2C slots via signal lines, the logic control unit being configured for receiving the first logic control signal and generating an enabling signal to enable the one of the I2C slots to which the to-be-transmitted data will be transmitted, in response to the first logic control signal; and an I2C switch unit connected to the CPU via a first I2C bus and each of the I2C slots via second I2C buses, the I2C switch unit configured for receiving and transmitting the I2C signal to the enabled I2C slot.

2. The I2C multi-slots circuit system as recited in claim 1, wherein the CPU comprises a storage unit storing the addresses of the I2C slots.

3. The I2C multi-slots circuit system as recited in claim 1, wherein the logic control unit comprises a plurality of ports for transmitting the enabling signal, and each of the ports is connected to one of I2C slots via one of the signal lines.

4. The I2C multi-slots circuit system as recited in claim 1, wherein the CPU is further configured for providing a second logic control signal to disable the enabled I2C slot when determining that the transmission of the I2C signals is finished.

5. A method for transmitting I2C signals applied in an I2C multi-slot circuit system, the I2C multi-slot circuit system comprising a plurality of I2C slots for receiving a plurality of slaves and an I2C switch unit, the method comprising:

determining an address of one of the I2C slots to which to-be-transmitted data will be transmitted, and generating a first logic control signal according to the determined address;

receiving the first logic control signal via a logic data line, and generating an enabling signal to enable the one of the I2C slot to which the to-be-transmitted data will be transmitted via a signal line, in response to the first logic control signal;

converting the to-be-transmitted data into an I2C signal; and receiving the I2C signal via a first I2C bus, and transmitting the I2C signal to one of the slaves connected to the enabled I2C slot via a second I2C bus, wherein receiving the I2C signal is by the I2C switch connected to the CPU via a first I2C bus, and transmitting the I2C signal is by the I2C switch connected to each of the I2C slots via second I2C buses.

6. The method as recited in claim 5, further comprising:
turning on the I2C switch unit after enabling the I2C slot according to the first logic control signal.

7. The method as recited in claim 5, further comprising:
generating a second signal logic control signal to disable the enabled I2C slot when determining that transmission of the I2C signals is finished.

\* \* \* \* \*